(12) United States Patent
Chakra et al.

(10) Patent No.: US 7,743,018 B2
(45) Date of Patent: Jun. 22, 2010

(54) TRANSIENT STORAGE IN DISTRIBUTED COLLABORATIVE COMPUTING ENVIRONMENTS

(75) Inventors: Al Chakra, Cary, NC (US); David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 11/279,184

(22) Filed: Apr. 10, 2006

(65) Prior Publication Data

US 2007/0239695 A1 Oct. 11, 2007

(51) Int. Cl.
G06F 7/00 (2006.01)

(52) U.S. Cl. .................................................. 707/609
(58) Field of Classification Search .................. 707/10
See application file for complete search history.

(56) References Cited

U.S. PATENT DOCUMENTS 5,987,506 A * 11/1999 Carter et al. ................ 709/213

| | | | |
|---|---|---|---|
| 2002/0083079 A1 | 6/2002 | Meier et al. | |
| 2002/0083145 A1 | 6/2002 | Perinpanathan | |
| 2003/0088593 A1* | 5/2003 | Stickler | 707/205 |
| 2003/0093434 A1* | 5/2003 | Stickler | 707/103 R |
| 2003/0187918 A1* | 10/2003 | Burbeck et al. | 709/203 |
| 2004/0196842 A1* | 10/2004 | Dobbins | 370/389 |
| 2004/0260876 A1 | 12/2004 | Singh et al. | |
| 2005/0060638 A1 | 3/2005 | Mathew et al. | |
| 2005/0193168 A1* | 9/2005 | Eguchi et al. | 711/114 |

* cited by examiner

*Primary Examiner*—Charles Rones
*Assistant Examiner*—Fazlul Quader
(74) *Attorney, Agent, or Firm*—Charles L. Moore; Moore & Van Allen, PLLC

(57) ABSTRACT

Content files are managed and tracked in a distributed collaborative computing environment to receive, store, and maintain content descriptor data associated with a distributed content files in a central directory registry. The central directory registry can be accessed by a plurality of remote distributed computing devices via one or more network connections. The remote distributed computing devices create content files using locally hosted software applications. Upon saving the content file to a portable or transient storage device connected to a computing device, content descriptor data comprised of administrative data pertaining to the content file and associated with the content file is created and forwarded to the central directory server.

20 Claims, 5 Drawing Sheets

| STATUS ⌐310 | UID / FILENAME ⌐320 | PRIVILEGES ⌐330 | AVAILABLE ⌐340 |
|---|---|---|---|
| ON-LINE | 05-632 / SALES FORECAST FOR Q4.XLS | READ / WRITE | IN |
| ON-LINE | 02-887 / COMPANY LOGO.JPG | READ ONLY | IN |
| OFF-LINE | 05-123 / PERFORMANCE APPRAISAL.TXT | READ ONLY | OUT |
| OFF-LINE | 06-014 / Q3 REVENUE REPORT.XLS | READ ONLY | OUT |
| ON-LINE | 05-854 / DGM PROPOSAL.PPS | READ / WRITE | IN |
| ON-LINE | 04-477 / PROPOSED WEB CHANGES.HTM | OWNER | IN |

FIG. 3

TRANSIENT STORAGE IN DISTRIBUTED COLLABORATIVE COMPUTING ENVIRONMENTS

BACKGROUND OF THE INVENTION

The present invention relates to utilizing portable storage devices (PSD) within a distributed collaborative computing environment that does not necessarily use or require centralized permanent storage of content.

Within the general computer arts there are many trends. One trend is the proliferation of collaborative computing environments in which multiple users can work with common or shared access computer files or content. Another trend is the ubiquity of portable storage devices including jump drives, memory keys, and/or removable storage media (e.g., compact flash, memory stick, etc.).

Portable storage devices come in a variety of types and form factors. They all share one common characteristic that uniquely qualifies them for inclusion in the present invention, portability. Portable storage devices allow users to store and carry large amounts of information inexpensively. A user need only find a computing device loaded with the requisite application software to access and manipulate the content contained by the portable storage devices. Moreover, if the computing device happens to be connected to a network like the Internet, the user can send and receive content to the portable storage device.

A collaborative computing environment generally refers to allowing multiple users using multiple computing devices to access shared or common files or content. Typically a collaborative computing environment maintains a permanent storage area where the content files are centrally managed. Users access the shared content based on an administrative scheme that defines rules of access to the shared files.

BRIEF SUMMARY OF THE INVENTION

In accordance with one embodiment of the present invention, a method of managing and tracking content files in a distributed collaborative computing environment may include receiving content descriptor data. The content descriptor data describes a content file stored in memory, transient or portable storage device, or the like that is associable with a remote computing device. The content descriptor data may then be stored. The content descriptor data may be added to a central directory registry of data pertaining to other content files that are being managed and tracked. The central directory registry may be accessible to at least one remote computing device within the collaborative computing environment such that the at least one remote computing device can locate and obtain a copy of the content file.

In accordance with another embodiment of the present invention is a system for managing and tracking content files in a distributed collaborative computing environment. The system may include a central directory server. The system may also include a directory registry accessible via the central directory server to store content descriptor data associated with a content file storable on a portable storage device. The content descriptor data may include data related to a current location of the content file in response to the content file being accessible in the distributed collaborative computing environment.

In accordance with yet another embodiment of the present invention is a computer program product for managing and tracking content files in a distributed collaborative computing environment. The computer program product may include a computer usable medium having computer usable program code embodied therewith. The computer usable medium may include computer usable program code configured to track a current status and a current location of a content file in the distributed collaborative computing environment, wherein the content file is storable on a portable storage device. The computer useable medium may also include computer usable program code configured to update content descriptor data responsive to a change in at least one of the current status and the current location of the content file, wherein the content descriptor data may include the current status and current location of the content file.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 3 is an example of a directory listing of files maintained by the central directory server in accordance with an embodiment of the present invention.

DETAILED DESCRIPTION OF THE INVENTION

Figure 1:
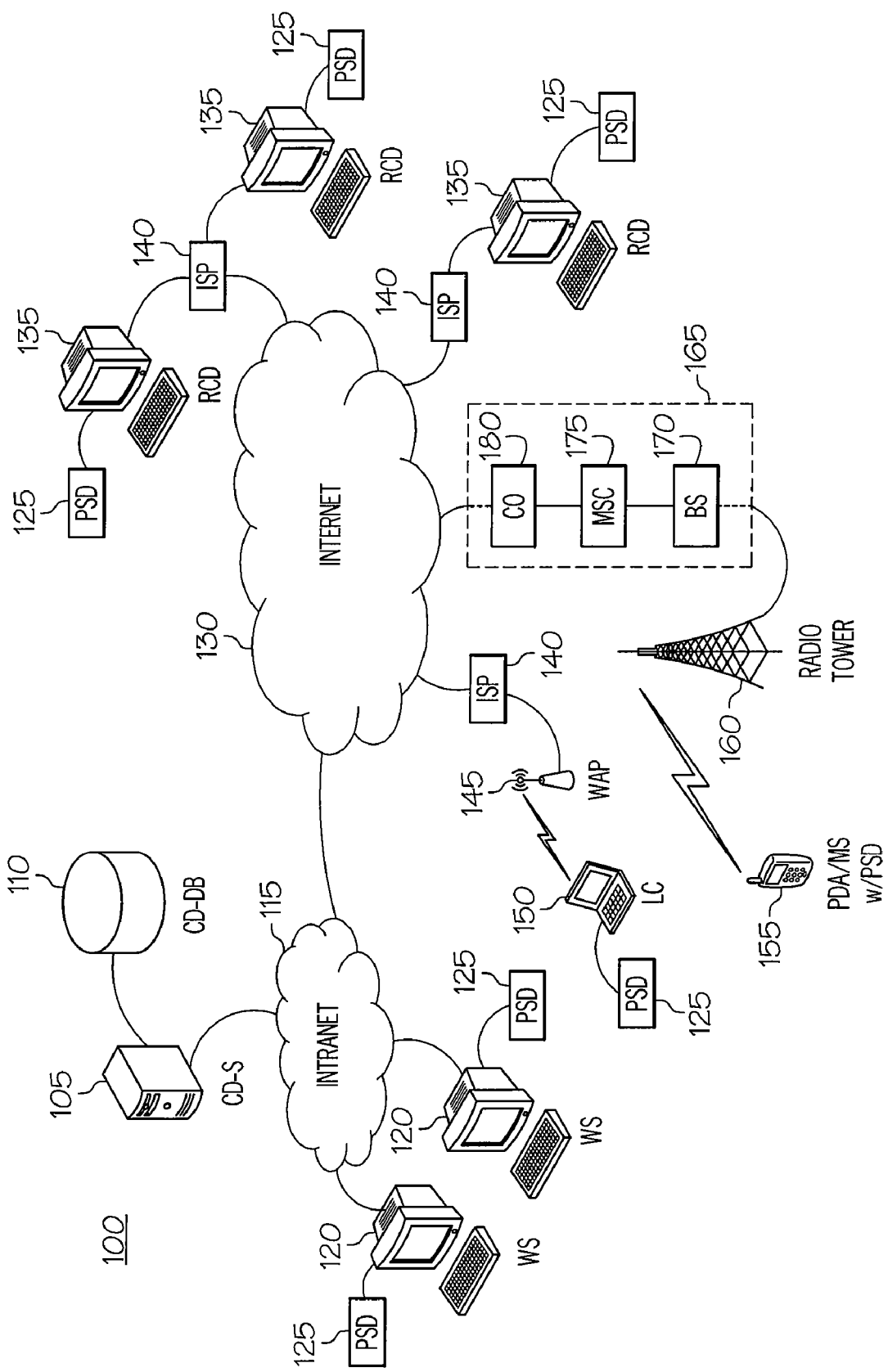
FIG. 1 is a block diagram of an example of a distributed collaborative computing environment in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an example of a distributed collaborative computing environment 100 in accordance with an embodiment of the present invention. At the heart of the exemplary distributed collaborative computing environment 100 is a central directory server (CDS) 105 and an associated content descriptor database (CD-DB) 110. The central directory server 105 hosts and executes an application that manages data pertaining to content files stored on the content descriptor database 110. The data pertaining to content files stored on the content descriptor database 110 refers to registry information about the content files not the actual content files. The content descriptor database 110 may define or may include a central directory register that may include information related to each content file. The registry information for a content file requires very little storage since the information can be stored in a relatively small number of data bytes.

The central directory server 105 and content descriptor database 110 or directory registry may be connected to a network such as a company Intranet 115. The Intranet 115 is accessible to a variety of computing devices such as workstations (WS) 120. The workstations 120 typically include I/O mechanisms to accommodate many different types of portable storage devices (PSD) 125. The portable storage devices 125 collectively may serve as the 'system' storage device for the distributed collaborative computing environment 100.

The Intranet 115 can be coupled or linked to other external networks such as the Internet 130. Appropriate security measures such as firewalls may be needed to maintain the integrity of the data entering or exiting the Intranet 115. The present invention assumes that such measures are in place and do not impact the methods described herein. If the Intranet 115 is communicable with the Internet 130, then a whole new dimension to the distributed collaborative computing environment 100 is enabled. Any remote computing device 135 possessing the requisite connection to the Internet 130 via an Internet Service Provider (ISP) 140 that can accommodate a portable storage device 125 can 'join' the distributed collaborative computing environment 100. Moreover, the Internet connection can be achieved wirelessly via a wireless access point (WAP) 145 that is served by an Internet Service Provider 140. Thus, a laptop computer 150 capable of accepting/using a portable storage device 125 can join the distributed collaborative computing environment 100 from a wireless 'hot spot' further enhancing the distributed aspect of the present invention.

In addition, there are now many wireless standards and protocols over cellular networks that can link to and exchange data with the Internet 130. This means that appropriately equipped personal digital assistants (PDA)/mobile stations (MS) 155 or the like having attachable or embedded personal storage devices can join the distributed collaborative computing environment 100 via a wireless connection from a personal digital assistant (PDA)/mobile station (MS) 155 to a radio tower 160 that is connected to a cellular infrastructure 165 which is in turn linked with the Internet 130. The cellular infrastructure 165 typically comprises some combination of a basestation 170, mobile switching center 175, and central office 180.

Figure 2:
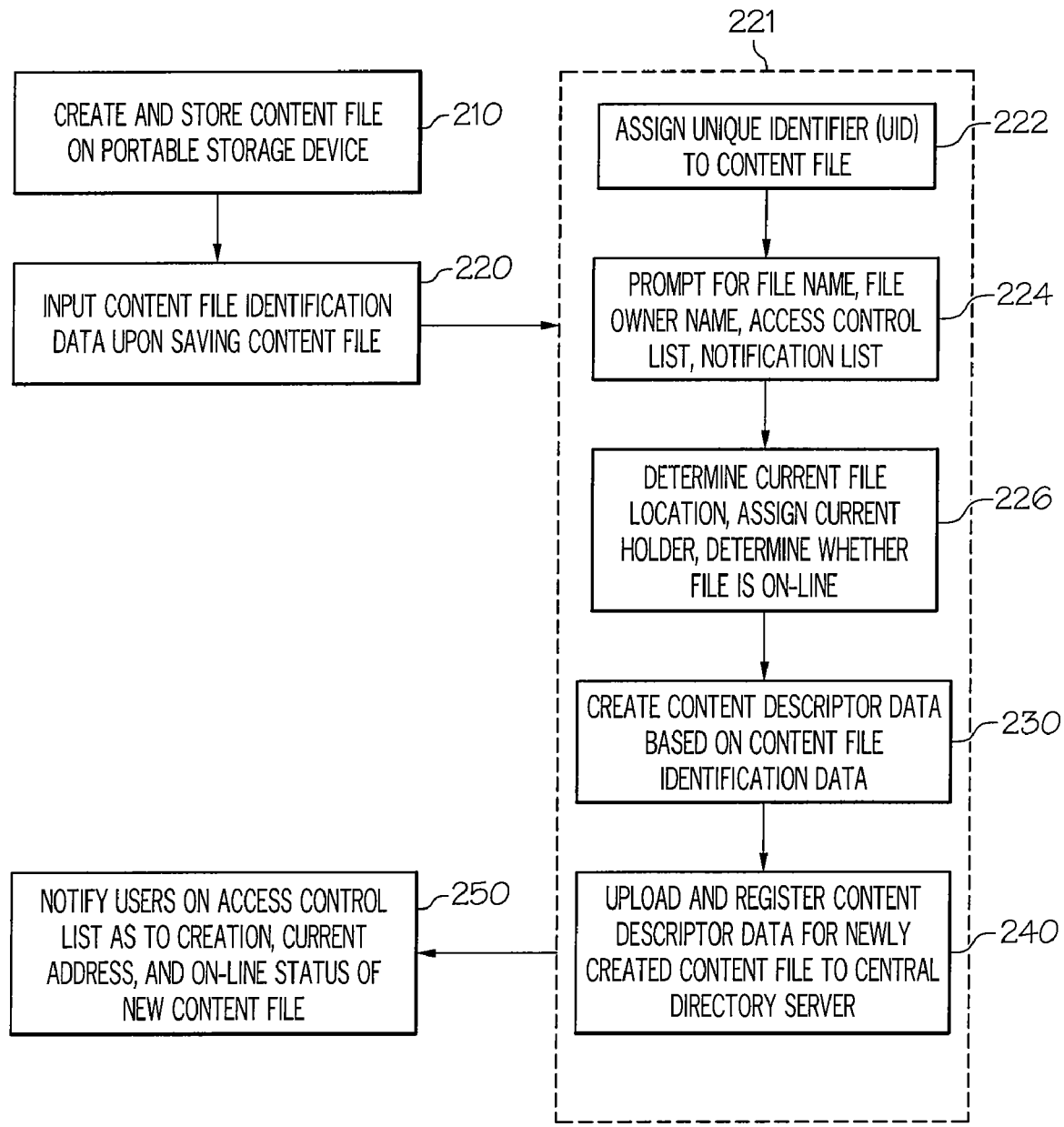
FIG. 2 is a flow chart of an example of a method for creating and storing a content file within a distributed collaborative computing environment in accordance with an embodiment of the present invention.

FIG. 2 is a flow chart of an example of a method for creating and storing a content file within a distributed collaborative computing environment, such as the environment 100 or a similar environment, in accordance with an embodiment of the present invention. A user may utilize a locally hosted software application to create and store a content file 210. The content file can be a text document, an image file, a spreadsheet, a database file, etc. depending on the application used to create the content file.

A second software application may be layered between the application(s) that create the content files and a central directory server, such as server 105 (FIG. 1). For descriptive purposes the second application can be termed the "transient storage" application 221. The transient storage application 221 can be stored on a portable storage device, such as device 125, and may serve as a link between multiple distributed portable storage devices using locally hosted software applications and the central directory server. Among other tasks, the transient storage application 221 may be responsible for updating the status of content files stored on portable storage devices to the central directory server.

When the user attempts to save a content file 220 using the application that created the content file, the transient storage application 221 may be automatically launched to manage the saving process. The transient storage application 221 supplies a unique identifier (UID) 222 to be associated with the content file and prompts the user to provide additional data 224 about the content file including, but not limited to, a file name (need not be unique), the file owner's name, an access control list (ACL) of users permitted to use the content file, and a notification list of users who will be notified when the content file's status changes. Additionally, the transient storage application 221 may automatically determine the file's current location (IP address and local file directory address), initially assign the file owner as the current holder, and determine whether the file is 'on-line' (available to other users) 226. The transient storage application 221 may record this saved data as content descriptor data 230 that will be associated with the actual content file.

Once the content file has been locally saved on the portable storage device the content descriptor data may be uploaded 240 to the central directory server by the transient storage application where it is registered and grouped with other content descriptor data that comprise the distributed collaborative computing environment. The central directory server may then automatically broadcast a message to the users identified on the access control list informing that the new content file has been created, where it is currently located, and its on-line status 250. The message may be broadcast from the central directory server via e-mail, instant messaging (IM), telephonically, or any other suitable mechanism. Anyone on an access control list, notification list of the like may be notified in response to any change in the content file, such as a change in status or location of the content file. Notification may include providing sufficient information to identify the current location of the content file in the distributed collaborative computing environment. The content file may be treated as persistent content or a persistent file in response to the content file being on-line.

The mechanism of delivery of the broadcast message can be determined by the stated preferences contained within a user profile file. The user profile file is created by each user and uploaded to the central directory server. The user profile file can include, but is not limited to, data such as name, security data (e.g., password), and notification preference (e.g., e-mail, IM, SMS). The user maintains a copy of his profile file on his portable storage device and can edit and re-upload it to the central directory server as desired.

FIG. 3 is an example of a directory listing 300 of files maintained by the central directory server in accordance with an embodiment of the present invention. A user may connect to a computer or computing device that can establish a physical link with the central directory server like those described in FIG. 1. The user can now perform a directory listing 300 of content files registered with the central directory server. The directory listing 300 can present multiple fields of data that describe the user's current ability to access the content files. For instance, the directory listing 300 can include a 'status' field 310 that indicates whether the content file is currently on- or off-line, an identifier field 320 that lists the UID and name of the content file, a privilege field 330 that describes the level of access the user has with respect to the content file, and a field indicating whether the content file is currently checked out by another user 340. Line 350 has been highlighted or otherwise distinguished from other lines by the user using standard computer interface navigation techniques (e.g., mouse). Line 350 indicates that the content file is on-line and not checked out. Line 350 also indicates that the user has read/write access or privileged relative to the highlighted file meaning he can check out the content file and edit it if he so desires. The physical address or current location of the content file is a field known to the central directory server such that it can locate and deliver the content file to the user if requested even if the address field is not necessarily shown in the directory listing 300.

Additional information/fields can be included in the directory listing 300 such as file owner, file address, date of last modification, user ID of user if file is checked out, etc. The directory listing can be individually customized to suit a users needs. Thus, FIG. 3 is intended to be exemplary in nature.

Figure 4:
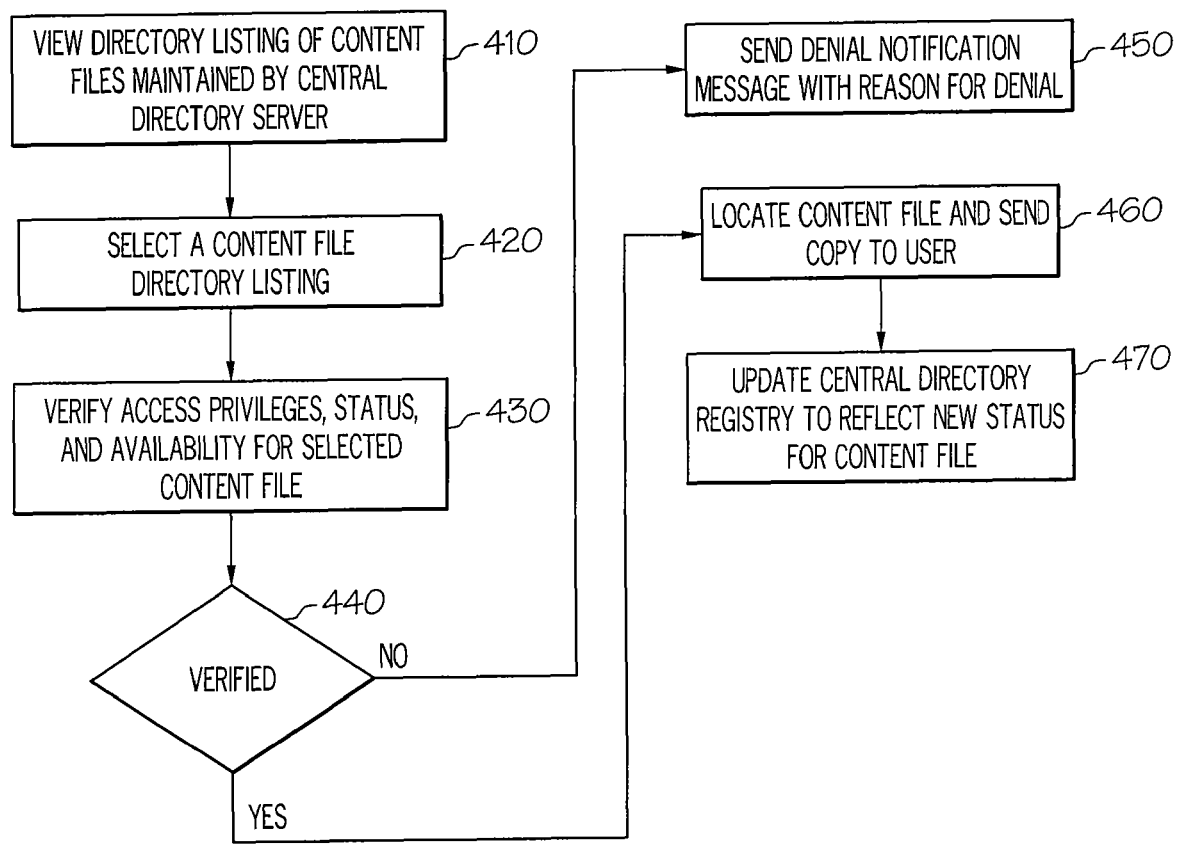
FIG. 4 is a flow chart of an example of a method for accessing or checking out a content file maintained by a central directory registry in accordance with an embodiment of the present invention.

FIG. 4 is a flow chart of an example of a method for accessing or checking out a content file maintained by a central directory registry in accordance with an embodiment of the present invention. The user first calls up a directory listing of content files maintained by the central directory server in a central directory registry 410 similar to that illustrated in FIG. 3. The user navigates the listing until a desired file is highlighted and selected 420. The central directory server receives the request for the content file and verifies that the user has privileges that allow checking out, that the content file is on-line, and that the content file is not already checked out 430. If the verification check 440 fails any of the criteria a denial notification message is returned to the user 450 indicating the reason for denial. Otherwise, the central directory server will locate the requested content file and send a copy to the user 460. The central directory server will then update the central registry to reflect that the content file has been checked out 470.

Figure 5:
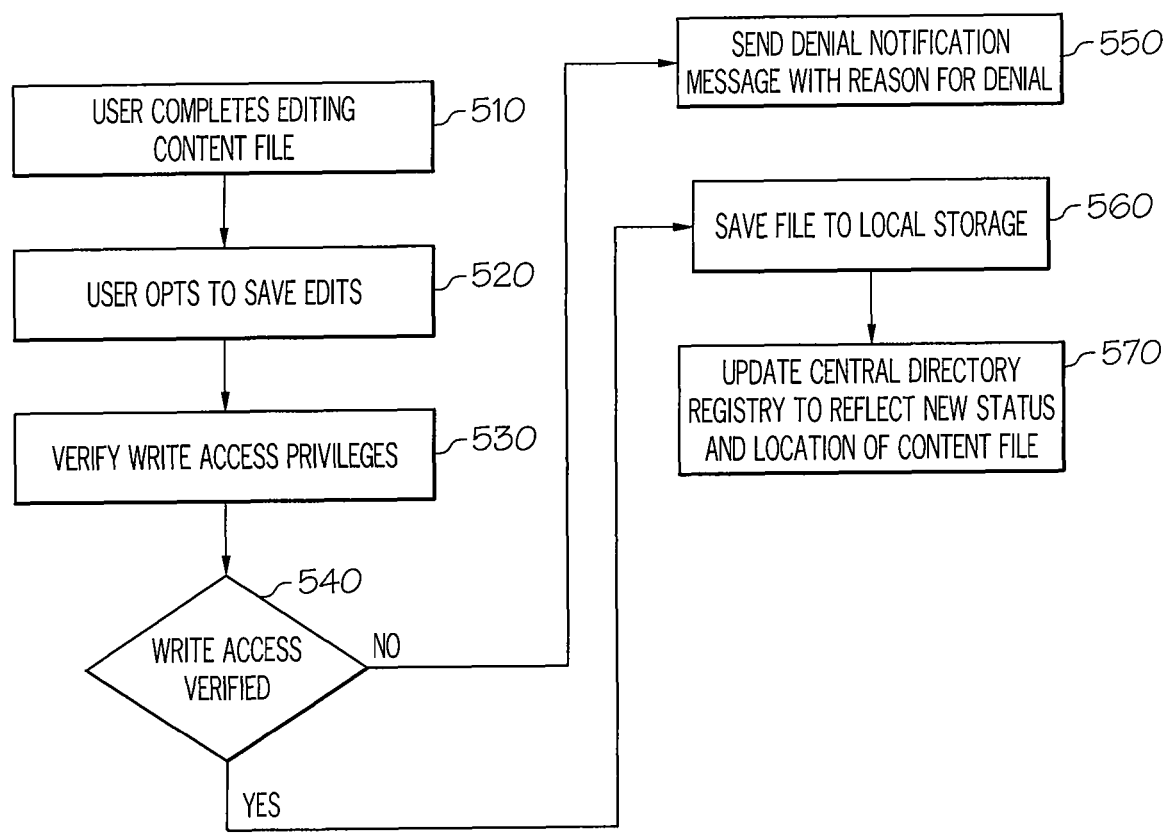
FIG. 5 is a flow chart of an example of a method for replacing or checking in a content file back to the central directory registry in accordance with an embodiment of the present invention.

FIG. 5 is a flow chart of an example of a method for replacing or checking in a content file back to the central directory registry. The user completes editing the checked out file 510 and opts to save the edits 520. The transient storage application communicates with the central directory server to verify that the user has write access to the checked out file 530. If write access is denied the user receives a denial notification 540 and the edits cannot be saved into the central directory registry. It may be possible to still save the file locally but it will not be a part of the distributed collaborative computing environment. Under these circumstances, the original unedited file may remain as part of the distributed collaborative computing environment. If the write access is verified the file is saved to local storage 560. The transient storage application then informs the central directory server that it can update the central registry to mark the content file as checked in and supplies the current location/address of the content file 570.

Content files can be determined to be on-line or off-line using any number of techniques including, but not limited to, active notification, leases, heartbeats, and the like.

The owner of a document can override the current holder. For instance, the owner has an original copy of the content file on his portable storage device since he created the content file. Another user may have checked the content file out to make edits. The owner has the privilege of being able to edit his local copy and check it back into the central registry even though the content file is either off-line or checked out. When the other user attempts to check his edits to the content file back in to the central registry it will be denied. Any revisions to the content file may be rejected in response to the current holder of the content file attempting to return the off-line version to the distributed collaborative environment in response to the owner overriding the current holder and replacing the off-line version with a new version of the content file.

A current holder of a content file may have to be authenticated by the server in response to the current holder attempting to put the content file back on-line. The central directory registry may be updated to point to the current location of the content file in response to the authentication being successful. Authentication may involve confirming that the user or content holder had the appropriate privileges relative to the content file, such as revising or editing.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method of managing and tracking content files in a distributed collaborative computing environment, comprising:

receiving only content descriptor data at a central directory server in response to a content file being saved on a portable storage device, wherein the content descriptor data comprises administrative data pertaining to the content file, and wherein the content descriptor data is generated by a transient storage application stored on the portable storage device;

storing the content descriptor data pertaining to the content file stored on the portable storage device that is associable with a remote computing device, wherein the portable storage device is transient and movable for association with another computing device in the distributed collaborative computing environment, and the portable storage device, along with a plurality of other portable storage devices, are each movable and associable with a different remote computing device, and collectively serve as a system storage device for the distributed collaborative computing environment, and wherein only the content descriptor data is stored at the central directory server; and adding the content descriptor data to a central directory registry of content descriptor data for other content files being managed and tracked, wherein the central directory registry is accessible to at least one remote computing device within the distributed collaborative computing environment such that the at least one remote computing device can locate and obtain a copy of the content file.

2. The method of claim 1, further comprising receiving the content descriptor data in the central directory server responsible for managing and tracking content files in a distributed collaborative computing environment.

3. The method of claim 1, further comprising forming the content descriptor data, wherein forming the content descriptor data comprises at least one of:

assigning unique file identifier data to distinguish the content file from the other content files;

receiving file name data;

receiving file owner data for indicating an identity of at least one of a creator of the content file and an entity responsible for the content file;

determining current file holder data for indicating which user is currently working with the file;

determining file status data for indicating whether the content file is currently on-line or off-line;

receiving access control list data for indicating which users have access to the content file and the privileges each user has with respect to the content file;

receiving notification list data for indicating which users receive a status update when the status of the content file is changed; and determining current location data for indicating where the content file can be retrieved in response to the content file being on-line.

4. The method of claim 3, wherein determining current location data comprises determining a combination IP address and file directory address.

5. The method of claim 1, further comprising notifying anyone on a notification list in response to a change in status of the content file.

6. The method of claim 5, wherein notifying anyone on the notification list comprises providing sufficient information to identify a current location of the content file in the distributed collaborative computing environment and any changes in the current location.

7. The method of claim 1, further comprising treating the content file as persistent content in response to the content file being on-line.

8. The method of claim 1, further comprising determining a status of the content file by at least one of a group comprising active notification, leases and heartbeats.

9. The method of claim 1, further comprising:
allowing an owner of the content file to override a current holder of the content file and to replace an off-line version of the content file with a new version; and
rejecting any revisions to the content file in response to the current holder attempting to return the off-line version to the distributed collaborative environment.

10. The method of claim 1, further comprising:
authenticating a current holder of the content file in response to the current holder attempting to put the content file back on-line; and
updating the central directory registry to point to a current location of the content file in response to the authentication being successful.

11. The method of claim 1, further comprising:
communicating with the central directory register to verify that a user has write access to the content file when the content file is checked out by the user and in response to the user attempting to save the checked out content file as edited by the user to replace the content file in the distributed collaborative computing environment;
sending a denial notification in response to the user not having write access to the checked out content file;
allowing the user to save the checked out content file as edited by the user on a local computing device of the user and not as part of the distributed collaborative computing environment; and
maintaining the content file as unedited by the user in the distributed collaborative computing environment in response to the user not having write access to the checked out content file.

12. A system for managing and tracking content files in a distributed collaborative computing environment comprising:
a central directory server for receiving only content descriptor data in response to a content file being saved on a portable storage device, wherein the content descriptor data comprises administrative data pertaining to the content file, and wherein the content descriptor data is generated by a transient storage application stored on the portable storage device;
a content descriptor database for storing the content descriptor data pertaining to the content file stored on the portable storage device that is associable with a remote computing device, wherein the portable storage device is transient and movable for association with another computing device in the distributed collaborative computing environment, and the portable storage device, along with a plurality of other portable storage devices, are each movable and associable with a different remote computing device, and collectively serve as a system storage device for the distributed collaborative computing environment, and wherein only the content descriptor data is stored in the content descriptor database; and
a module to add the content descriptor data to a central directory registry of content descriptor data for other content files being managed and tracked, wherein the central directory registry is accessible to at least one remote computing device within the distributed collaborative computing environment such that the at least one remote computing device can locate and obtain a copy of the content file.

13. The system of claim 12 wherein the content descriptor data comprises at least one of:
a unique file identifier to distinguish the content file from the other content files; a file name;
file owner data for indicating an identity of at least one of a creator of the content file and an entity responsible for the content file;
current file holder data for indicating which user is currently working with the file;
file status data for indicating whether the content file is currently on-line or off-line;
an access control list for indicating which users have access to the content file and the privileges each user has with respect to the content file;
a notification list for indicating which users receive a status update when the status of the content file is changed; and
current location data for indicating where the content file can be retrieved in response to the content file being on-line.

14. The system of claim 12, further comprising a transient storage application stored on each portable storage device, the transient storage application comprising:
a module to create the content descriptor data;
a module to upload the content descriptor data to the central directory server.

15. The system of claim 12, further comprising a transient storage application stored on each portable storage device, the transient storage application comprising:
a module to prompt the user for an identification of a file owner of the content file in response to the user saving the content file;
a module to determine a current location of the content file in response to the user saving the content file; and
a module to determine if the content file is on-line for being accessed by other remote computing devices.

16. A computer readable storage medium having computer usable program code embodied therewith for managing and tracking content files in a distributed collaborative computing environment, the computer readable storage medium comprising:
computer usable program code configured to receive only content descriptor data at a central directory server in response to a content file being saved on a portable storage device, wherein the content descriptor data comprises administrative data pertaining to the content files wherein the content descriptor data is generated by a transient storage application stored on the portable storage device;
computer usable program code configured to store the content descriptor data pertaining to the content file stored on the portable storage device that is associable with a remote computing device, wherein the portable storage device is transient and movable for association with another computing device in the distributed collaborative computing environment, and the portable storage device, along with a plurality of other portable storage devices, are each movable and associable with a different remote computing device, and collectively serve as a system storage device for the distributed collaborative computing environment, and wherein only the content descriptor data is stored at the central directory server; and
computer usable program code configured to add the content descriptor data to a central directory registry of content descriptor data for other content files being managed and tracked, wherein the central directory registry is accessible to at least one remote computing device within the distributed collaborative computing environment such that the at least one remote computing device can locate and obtain a copy of the content file.

17. The computer readable storage medium of claim 16, further comprising:

computer usable program code configured to form the content descriptor data, wherein computer usable program code configured to form the content descriptor data comprises at least one of:

computer usable program code configured to assign unique file identifier data to distinguish the content file from the other content files;

computer usable program code configured to receive file name data;

computer usable program code configured to receive file owner data for indicating an identity of at least one of a creator of the content file and an entity responsible for the content file;

computer usable program code configured to determine current file holder data for indicating which user is currently working with the file;

computer usable program code configured to determine file status data for indicating whether the content file is currently on-line or off-line;

computer usable program code configured to receive access control list data for indicating which users have access to the content file and the privileges each user has with respect to the content file;

computer usable program code configured to receive notification list data for indicating which users receive a status update when the status of the content file is changed; and computer usable program code configured to determine current location data for indicating where the content file can be retrieved in response to the content file being on-line.

18. The computer readable storage medium of claim 16, further comprising:

computer usable program code configured to communicate with the central directory register to verify that a user has write access to the content file when the content file is checked out by the user and in response to the user attempting to save the checked out content file as edited by the user to replace the content file in the distributed collaborative computing environment;

computer usable program code configured to send a denial notification in response to the user not having write access to the checked out content file;

computer usable program code configured to allow the user to save the checked out content file as edited by the user on a local computing device of the user and not as part of the distributed collaborative computing environment; and computer usable program code configured to maintain the content file as unedited by the user in the distributed collaborative computing environment in response to the user not having write access to the checked out content file.

19. The computer readable storage medium of claim 16, further comprising computer usable program code configured to notify anyone on a notification list in response to a change in status of the content file.

20. The computer readable storage medium of claim 16, further comprising computer usable program code configured to determine a current location of the content file in response to a request to check out the content file and in response to the content file being on-line in the distributed collaborative computing environment and available for check out.

\* \* \* \* \*